July 23, 1968    E. R. SCHLEIGER ET AL    3,394,258
APPARATUS FOR THERMALLY MEASURING ABSORBED RADIATION DOSES
Filed Feb. 19, 1965

INVENTORS
EUGENE R. SCHLEIGER
NORMAN (NMI) GOLDSTEIN
BY

ATTORNEYS

United States Patent Office 3,394,258
Patented July 23, 1968

3,394,258
APPARATUS FOR THERMALLY MEASURING ABSORBED RADIATION DOSES
Eugene R. Schleiger, Tiburon, and Norman Goldstein, Berkeley, Calif., assignors to the United States of America as represented by the Secretary of the Navy
Filed Feb. 19, 1965, Ser. No. 434,145
8 Claims. (Cl. 250—83.3)

ABSTRACT OF THE DISCLOSURE

The apparatus includes a radiation absorber member carried in a chamber formed of a thermal heat shield, the temperature of the shield being maintained constant by being disposed in substantial thermal contact with a reservoir containing a cryogenic fluid, such as liquid nitrogen. To minimize undesired environmental temperature variations the shield chamber is evacuated. Also the reservoir is surrounded by evacuated space provided between the walls of an external casing and the reservoir. A driven windlass means permits the absorber to be drawn into thermal contact with the reservoir wall where the absorber temperature reaches that of the wall. Temperature sensing of external radiation doses to which the absorber member may be subjected is achieved by placing a themistor in contact with the absorber and electrically coupling the thermistor to temperature recording means. A further feature lies in the physical arrangement of parts which enables complete portability.

The invention described herein may be manufactured and used by or for the Government of the United States of America for governmental purposes without the payment of any royalties thereon or therefor.

The present invention relates to calorimeters and, in particular, to microcalorimeters for the measurement of absorbed doses of ionizing radiation.

It often is desirable to describe quantitatively the effects of ionizing radiation upon matter in terms of the actual energy absorbed by the matter during the irradiation. This amount of absorbed energy is called the absorbed dose and is expressed in units of rads, where the rad is defined as 100 ergs of absorbed energy per gram of absorbing material. In most materials the absorbed energy is entirely converted to heat energy so that the measurement of the temperature rise of the irradiated material provides a fundamental and direct method of determining absorbed dose. The advantages of the calorimetric determination of absorbed dose have been demonstrated and have led to the recommendation that it be used for primary standardization of absorbed dose for photon energies above 1.0 mev.

A number of calorimeters have been developed which are sufficiently sensitive to provide reasonably accurate measurements of the absorbed radiation dose. However, increasing the sensitivity of a calorimeter obviously makes it more vulnerable to the effects of temperature fluctuations in the surrounding environment so that one absolute requirement has been to provide suitable protection from this changing environment. For example, a controlled temperature bath completely surrounding the absorber member of the calorimeter has been employed and, although the calorimeter so protected may be highly sensitive, the sensitivity is achieved at the sacrifice of portability which itself is a prime consideration in permitting the insturment to be moved from one location to another.

Other types of calorimeters, in recognizing the importance of portability, have attempted to reduce the size of the instrument by employing a jacket around the absorber, the jacket being held at the temperature of the absorber by electrical heating. However, such calorimeters are subject to a converse consideration in that they achieve portability at the sacrifice of sensitivity. For example, one of these prior instruments apparently sets a minimum dose rate limit of approximately 50 rads per minute whereas it is most desirable to provide instruments capable of measuring an absorbed dose rate as low as 2 rads per minute. Other calorimeters of this type may have greater sensitivity but their use is limited to an environment which has a well controlled temperature.

In addition to protection from room temperature fluctuations, it also is highly important to provide an instrument in which there will be a minimum of scattering and absorption of the radiation by calorimeter parts other than the absorber. The absorber should be wholly responsive to the temperature of the materials being tested, and in addition, the temperature of these materials should not be attenuated by unwanted scattering and absorption.

It is therefore an object of the present invention to provide a calorimeter for the purposes previously described, the calorimeter having adequate thermal stability and temperature sensitivity to permit satisfactory calibrations at an equivalent of absorbed dose rate of about 2 rads per minute.

An equally important object is to provide a calorimeter in accordance with the foregoing objects, the calorimeter being sufficiently portable to permit ease of movement from one location to another and also sufficiently compact to permit installation in small spaces and in close proximity to radiation sources.

A further object which will become more apparent in the ensuing description is to provide a calorimeter having minimum time requirements for setting up and reaching thermal equilibrium.

Yet another object is to minimize scattering and absorption of the radiation by calorimeter parts other than its absorber member.

Other objects, such as simplicity of construction, also will become more apparent in the following description.

The objects of the invention are achieved by providing a calorimeter in which an absorber member, formed preferably of beryllium, aluminum or the like, is supported within a metallic thermal shield, the absorber also being in thermal contact with a very sensitive sensor, such as a thermistor. Also, the shield is placed in thermal contact with a cryogenic bath, such as a liquid nitrogen reservoir, to hold the shield at a constant temperature and to provide the required temperature stability for the absorber. Heat transfer between the environment and shield is minimized by disposing the shield and the other members in a vacuum and also by utilizing polished surfaces.

Another feature, which will be described later, is the use of a so-called thermal switch to make possible a rapid equalization of the absorber and the shield temperature to permit a relatively short set-up time.

One embodiment of the invention is illustrated in the accompanying drawing in which.

Figure 1:
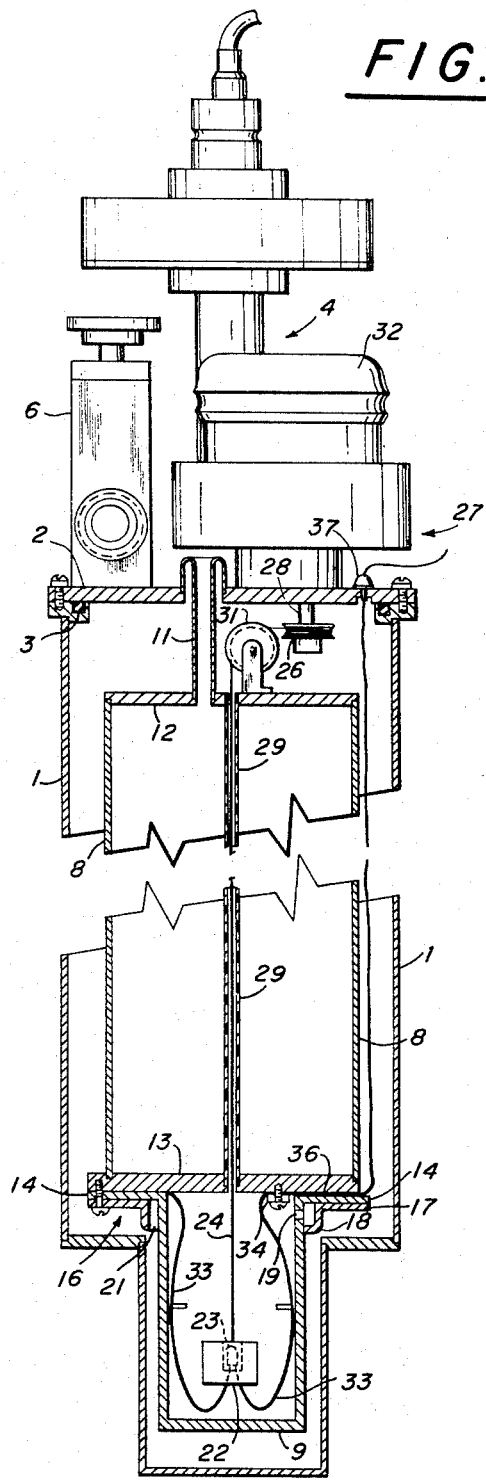
FIG. 1 is a partially-sectioned elevation of the calorimeter.

Referring to FIG. 1, the calorimeter is formed of a cylindrical casing 1 of polished stainless steel or aluminum, the casing having a top cover 2 securely bolted in place and also sealed by use of O-rings 3 or the like. The sealing is required since the casing must be airtight to permit the interior of the chamber to be evacuated by means of a battery-operated vacuum pump, generally indicated by numeral 4, the pump being mounted in and supported by cap 2. As has been indicated, the vacuum created in the interior of the casing is a significant factor in promoting thermal isolation. The lower portion of casing 1 is reduced in diameter both to minimize size and to improve operation.

A valve 6 also is supported by cap 2 and, of course, both vent valve 6 and the vacuum pump communicate with the interior of casing 1. Details of these members are not considered necessary since they are commercially available components mounted and operating in conventional manners.

Supported within casing 1 is a reservoir 8 which, in turn, carries a shield member 9 the major portion of which projects into the lower, reduced-diameter section of the casing. Reservoir 8 is adapted to be filled with liquid nitrogen or with other cryogenic liquids and for this purpose, there is provided a fill tube 11. Most suitably, reservoir 8 may be formed of copper and provided with a top wall 12 and a bottom wall 13.

Shield 9, which may be formed of polished aluminum or, if preferred, by beryllium gold plated inside and out, is bolted in the apparent manner to bottom wall 13 of the reservoir, the shield being formed with a radially extending flange 14 to permit the securement and also to provide a flush contact between the shield and the liquid nitrogen reservoir, the contact being sufficient to permit the shield to achieve the temperature of the reservoir. In subsequent description, contacts of this nature will be referred to as thermal contacts. Also, bolted to flange 14 of the shield, as well as bottom wall 13 of the reservoir, is a guard or baffle member, generally designated by numeral 16, this member having a radial flange 17 and a downwardly extending flange 18.

The purpose of the baffle is to minimize any radiative transfer between the inside wall of shield 9 and the wall of casing 1. To understand the purpose of the baffle, it first should be recalled that the interior of the casing is evacuated prior to use and, as would be surmised, it also is desirable to evacuate the interior of shield 9. Thus, the shield must be provided with a plurality of evacuation openings 19 and, except for the baffle, these openings would "look out" directly at the cylindrical wall of casing 1. Use of baffle 16 has been found in practice to be a substantial improvement since, it does, apparently minimize the undesired radiated transfer which has just been mentioned. To accomplish this, the downwardly extending flange 18 extends in front of openings 19 so as to prevent the opening from "looking out" directly at the casing wall. Also, to permit the interior of shield 9 to be evacuated, baffle 17 is provided with openings 21 which, of course, communicate with openings 19 in the shield and permit the interior of the shield to be pumped.

Suspended within shield 9 is an absorber member 22 which, as will be noted, is cup-shaped to receive a thermal sensor 23, which preferably is a thermistor. Here again, absorber 22 may be formed of solid aluminum or, if preferred, beryllium. The thermistor should be highly sensitive to temperature changes. For example, an appropriate thermistor obtainable commercially has a resistance of approximately 6 ohms at room temperature and a resistance of approximately 23,500 ohms at 77° K. which, as will be appreciated, is the temperature achieved through the use of liquid nitrogen. The sensitivity of the thermistor at 77° K. is approximately 9.5% per degree centigrade. Also, thermal contact between thermistor 23 and absorber 22 may be insured by filling the portion of the absorber hole with a suitable silicone grease (not shown).

Absorber 22 is suspended within shield 9 by a fine nylon cord 24 which extends longitudinally through reservoir 8 and is received by a windlass 26 carried adjacent to top wall 12 of the reservoir. An appropriate winding mechanism 27 is supported by top wall 2 of the casing, being magnetically coupled to drive shaft 28. Since chamber 8 is to be filled with a liquid nitrogen, at atmospheric pressure, it is necessary that the tube 29 through which the nylon cord extends be welded or soldered in a vacuum-tight seal to top wall 12 and bottom wall 13. A substantial bend is given the tube to prevent thermal radiation through its bore. Also to facilitate winding and unwinding, an idler wheel 31 is carried by top wall 12 of the reservoir. The winding mechanism 27 has a wheel 32 which, when rotated, reels in or reels out the cord to either draw absorber 22 into thermal contact with bottom wall 13 of the reservoir or permit the absorber to drop free of reservoir into the illustrated position.

Figure 2:
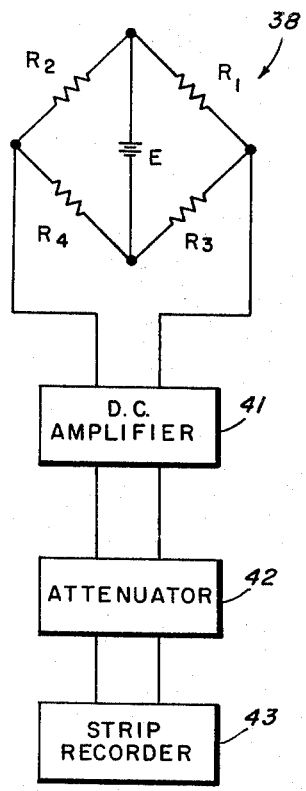
FIG. 2 is an electrical diagram of a suitable recorder apparatus for recording the temperature fluctuations of the calorimeter thermistor.

FIG. 2 illustrates suitable electrical components used to "read-out" and record the temperature changes of the thermistor. In this regard, it will be noted that thermistor 23 has the customary lead wires 33 which extend upwardly through the casing to be coupled into the electrical circuitry which provides the input for the temperature recording apparatus. However, one significant feature that should be noted is that lead wire 33 is securely clamped by means of clamp 34 to the bottom wall 13 of the reservoir 8, the purpose in the clamping arrangement being to provide a heat sink for the lead wires to minimize the temperature effect on the absorber in the event any temperature changes occur at the feedthrough of the lead wires in the top of the casing 1. Most suitably, the bottom surface of bottom wall 13 of the reservoir is provided with grooves 36 through which the lead wires extend. Appropriate insulation should be provided for clamp 34. Also, a Kovar feedthrough 37 is provided for the lead wire at the point at which it emerges from the top of casing 1.

Referring again to FIG. 2, changes in thermistor resistance are detached by a Wheatstone bridge circuit 38 in which $R_1$ is the thermistor $R_2$ the balancing resistance, and $R_3$ and $R_4$ the ratio arm resistances which, in practice may be of 100,000 ohms each. Battery E may be a 1.34 v. mercury cell. Using these values, power dissipation in a thermistor of the type described, due to bridge current, is approximately $3 \times 10^{-6}$ watts at liquid nitrogen temperature. This power corresponds to an absorbed dose rate of 2.5 rads per minute in a 7 gram aluminum absorber. The output of the bridge is applied to a DC amplifier 41 which, in turn, feeds an attenuator 42 which operates a strip recorder 43. Obviously, other indicating means can be employed in lieu of the present one.

In operation, after the calorimeter is assembled and the initial response to vacuum pumping indicates that there are no leaks, the reservoir is filled with liquid nitrogen. Preferably, the creation of the desired vacuum is accomplished by a large capacity pumping system coupled to the casing. However, as has been indicated improvement in portability can be achieved by using a small battery operated appendage pump such as pump 4. Such a pump maintains the vacuum at the desired level after the initial pump down has been accomplished by the large capacity system.

With the desired level of vacuum established, absorber 22 may be pulled into contact with bottom wall 13 of the liquid nitrogen reservoir and the temperature drop monitored. A contact force of 2 or 3 pounds is sufficient to produce the desired cooling rate. When the thermistor resistance indicates that the temperature is within a few tenths of the expected equilibrium temperature, contact between the absorber and the reservoir may be broken and several minutes then allowed for gradients within the absorber to stabilize. The rate of temperature change of the absorber is then noted and, if necessary, the contact between absorer and the liquid nitrogen reservoir reestablished for a few minutes. This process of intermittent cooling then may be continued until the absorber is in thermal equilibrium with its surroundings, this thermal equilibrium occurring approximately 78° K. The total time for such procedure is in a range of 2 to 3 hours which is recognized as a substantial saving in time over prior devices.

When thermal equilibrium has been established, the calorimeter is prepared for exposure. Obviously, to make an exposure the instrument either is brought into proximity with the particular material containing the radiation dosage to be determined or, if feasible, the material may be brought to the instrument itself. However, since many exposures involve stationary equipment, such as accelerators, portability of the calorimeter, to bring it in proximity with the accelerator, is needed.

It has been found that the absorber temperature is never completely table, i.e. λ background temperature drifts are usually apparent and should be subtracted out from the response of the absorber to radiation. After repeated irradiations, the absorber becomes sufficiently warmer than its surroundings so that the background drift or cooling becomes too large to be handled by simple correction. When this occurs, a short period of contact with the liquid nitrogen reservoir will return the absorber to its original temperature and irradiation then can be continued with the total loss of time of no more than fifteen minutes.

The performance of the calorimeter indicates that the use of a thermal shield held at constant temperature by contact with the liquid nitrogen container provides an environment for an absorber which is sufficiently stable to permit the measurement of an absorbed dose rate as low as about two aluminum rads per minute with a standard error of plus or minus 3% for the average of several runs. In addition, as will be apparent, the structure of the calorimeter provides the necessary portability and compactness to permit installation in small places and in close proximity to radiation sources. Also, the set-up time needed to obtain temperature stability is relatively short. The effect of room temperature on the calorimeter is unusually small, particularly at normal room temperature changes. For example, using a hot air type dryer, the outer surface of casing 1 was heated until its skin temperature, as measured by a clamped-on thermocouple, had increased by 18° C. in a time interval of 9 minutes. The corresponding temperature rise in the absorber was approximately $10^{-3}$° C., a change which corresponds to the heating effect of an absorbed dose of 32 rads. Since the use of the hot air dryer creates an extreme temperature variation which normally would not be encountered, it is apparent that the aluminum shield and its related components constitute an adequate substitute for the previous temperature controlled baths which, as already stated, preclude sufficient portability.

It is apparent that calorimeters of this type must be calibrated before use and, it has been customary to calibrate by measuring a temperature rise produced by electrical heating. However, in this calorimeter the calibration may be accomplished by placing the absorber in a radiation field of known exposure level. The advantages of this type of calibration include the simplification of absorber construction and circuitry, the elimination of heat paths which the two heater leads would constitute, the reduction of the percentage of "foreign" materials in the absorber, and uniformity of heat dissipation throughout the absorber mass. This method of calibration utilizes the measured sensitivity of the bridge system and the temperature-resistance calibration of the thermistor to provide an observed deflection rate for a given absorbed dose rate, the deflection rate being transformed to a calibration factor expressed as absorber temperature change per rad of absored dose. Although there will be certain possible errors in these calibration factors, the errors can be estimated and taken into consideration in arriving at the calibration factor.

Obviously many modifications and variations of the present invention are possible in the light of the above teachings. It is therefore to be understood that within the scope of the appended claims the invention may be practiced otherwise than as specifically described.

What is claimed is:

1. A radiation calorimeter comprising;
a casing,
a reservoir disposed interiorally of the casing in a spaced relationship thereto,
a thermal shield member carried by an in thermal contact with said reservoir,
evacuation coupling means for enabling a reduction in the atmospheric pressure within said casing and said shield,
a radiation absorbing member supported within said shield member in a spaced relationship thereto,
absorber-supporting means carried by the calorimeter and operable from the exterior of the casing for moving said absorber member into and out of thermal contact with said reservoir,
a temperature-responsive impedance device disposed in thermal contact with said absorber,
indicating means responsive to said temperature-responsive device, and
a circuit electrically coupling said temperature-responsive device to said indicating means,
said thermal contact of said previously recited elements being sufficient to permit each element to achieve the temperature of the other.

2. The calorimeter of claim 1 wherein said temperature-responsive device is a thermistor.

3. The calorimeter of claim 2 wherein;
said absorber-supporting means includes a thread-like member suspendably supporting the absorber, a windlass, and means for winding said thread for moving said absorber into and out of its thermal contact,
said thread-like member extending through said reservoir and said reservoir mounting a tube through which said thread-like member extends.

4. The calorimeter of claim 1 wherein said shield and absorber members are formed of a metal having high thermal conductivity and having polished surfaces.

5. The calorimeter of claim 4 wherein said members are formed of solid aluminum and said absorber member is shaped as a cylinder,
said temperature-responsive device being a thermistor disposed in said cylinder.

6. The calorimeter of claim 1 wherein said shield member is provided with a plurality of openings enabling said atmospheric reductions thereof;
said calorimeter further including a baffle member disposed adjacent said shield openings for minimizing radiative transfer between the interior surfaces of said shield member and said casing.

7. The calorimeter of claim 1 further including a battery-powered pump mounted on an exterior surface of the casing for maintaining the reduced atmospheric pressure within the casing.

8. The calorimeter of claim 1 wherein said indicating means includes a recorder and said circuit includes a resistive bridge circuit,
said temperature-responsive device being a thermistor formng an arm of said bridge circuit.

References Cited

UNITED STATES PATENTS

| | | | |
|---|---|---|---|
| 2,564,626 | 8/1951 | McMahon et al. | 250—83.3 X |
| 2,760,078 | 8/1956 | Youmans | 250—83.3 |
| 2,774,887 | 12/1956 | McMasters et al. | 250—83.3 |
| 3,049,620 | 8/1962 | George et al. | 250—71.5 |

RALPH G. NILSON, *Primary Examiner.*

S. ELBAUM, *Assistant Examiner.*